US012044695B2

(12) United States Patent
Held et al.

(10) Patent No.: US 12,044,695 B2
(45) Date of Patent: Jul. 23, 2024

(54) MEASUREMENT SYSTEM FOR DETERMINING LIQUID PROPERTIES IN A VESSEL

(71) Applicant: ABB Schweiz AG, Baden (CH)

(72) Inventors: Gerrit Held, Oberrohrdorf (CH); Stefano Marano, Zurich (CH); Miklos Lenner, Daettwil (CH); Frank Kassubek, Rheinfelden (DE)

(73) Assignee: ABB Schweiz AG, Baden (CH)

( * ) Notice: Subject to any disclaimer, the term of this patent is extended or adjusted under 35 U.S.C. 154(b) by 658 days.

(21) Appl. No.: 17/092,357

(22) Filed: Nov. 9, 2020

(65) Prior Publication Data

US 2021/0140864 A1    May 13, 2021

(30) Foreign Application Priority Data

Nov. 13, 2019  (EP) ..................... 19208994

(51) Int. Cl.
*G01N 9/24* (2006.01)
*G01F 23/2962* (2022.01)
*G01N 9/26* (2006.01)

(52) U.S. Cl.
CPC .......... *G01N 9/24* (2013.01); *G01F 23/2962* (2013.01); *G01N 9/26* (2013.01)

(58) Field of Classification Search
CPC .. G01N 9/24; G01N 9/26; G01N 2291/02818; G01N 2291/045;
(Continued)

(56) References Cited

U.S. PATENT DOCUMENTS 4,355,509 A    10/1982   Fulkerson
4,491,008 A *  1/1985   Marini ................. G01N 29/024
                                                   376/250
(Continued)

FOREIGN PATENT DOCUMENTS

CA    2924847 A1    11/2016
CN    1287616 A     3/2001
(Continued)

OTHER PUBLICATIONS

John G. Webster, Halit Eren, Measurement, instrumentation, and Sensors Handbook, ESBN 9781439848838, 2014.
(Continued)

*Primary Examiner* — Marrit Eyassu
(74) *Attorney, Agent, or Firm* — Leydig, Voit & Mayer, Ltd.

(57) ABSTRACT

A measurement system for determining a density ρ or a compressibility κ of a liquid medium in a vessel includes: at least one pressure sensor for measuring a hydrostatic pressure Δp of the liquid medium as a measured hydrostatic pressure Δp; at least one ultrasound sensor for measuring a first time of flight $t_1$ along a first propagation path comprising a point at a level surface of the liquid medium, and for measuring a second time of flight $t_2$ along a second propagation path, which is different from the first propagation path; and a control unit for determining the density ρ or the compressibility κ of the liquid medium based on the measured hydrostatic pressure Δp, the first time of flight $t_1$, and the second time of flight $t_2$.

9 Claims, 4 Drawing Sheets

(58) Field of Classification Search
CPC .......... G01N 2291/105; G01N 29/222; G01N 29/024; G01N 29/4472; G01N 2291/011; G01N 2291/022; G01F 23/2962
USPC .......................................................... 73/438
See application file for complete search history.

(56) References Cited

U.S. PATENT DOCUMENTS

| | | |
|---|---|---|
| 6,474,137 B1 | 11/2002 | Hammond et al. |
| 2004/0011141 A1* | 1/2004 | Lynnworth ............. G01F 1/667 73/861.27 |
| 2005/0072226 A1 | 4/2005 | Pappas et al. |
| 2009/0093977 A1* | 4/2009 | Hauptmann ............ G01F 1/668 702/54 |
| 2009/0229341 A1* | 9/2009 | DiFoggio ............. G01N 29/032 73/25.03 |
| 2010/0242593 A1 | 9/2010 | Lagergren et al. |
| 2011/0083503 A1* | 4/2011 | Iverson ................ G01N 33/383 73/290 V |
| 2011/0154901 A1* | 6/2011 | Calle ..................... G01N 29/11 73/579 |
| 2017/0003209 A1* | 1/2017 | Estrada ................. G01N 29/02 |
| 2017/0010143 A1* | 1/2017 | Kassubek ............. G01F 23/284 |
| 2017/0010146 A1 | 1/2017 | Kassubek et al. |
| 2018/0266996 A1 | 9/2018 | Fokow |
| 2019/0056257 A1 | 2/2019 | Bellmann |

FOREIGN PATENT DOCUMENTS

| | | | | |
|---|---|---|---|---|
| CN | 1432125 A | 7/2003 | | |
| CN | 102187214 A | 9/2011 | | |
| CN | 102252731 A | 11/2011 | | |
| CN | 102362178 A | 2/2012 | | |
| CN | 103674181 A | 3/2014 | | |
| CN | 104729957 A | 6/2015 | | |
| CN | 105044209 A | 11/2015 | | |
| CN | 106338317 A | 1/2017 | | |
| CN | 106338320 A | 1/2017 | | |
| CN | 106441507 A | 2/2017 | | |
| CN | 106772393 A | 5/2017 | | |
| CN | 206469934 U | 9/2017 | | |
| DE | 10112583 A1 | 10/2002 | | |
| DE | 102006023752 A1 | * 11/2007 | ......... | G01F 23/0061 |
| DE | 102011086774 A1 | * 5/2013 | .......... | F01N 3/2066 |
| EP | 2012117 A1 | 1/2009 | | |
| EP | 3115753 A1 | 1/2017 | | |
| JP | 11-218436 A | 8/1999 | | |
| JP | 2004286745 A | * 10/2004 | ............. | B65D 90/48 |
| JP | 2006322825 A | * 11/2006 | | |
| WO | WO 2007097688 A1 | 8/2007 | | |
| WO | WO 2011017355 A2 | 2/2011 | | |

OTHER PUBLICATIONS

National Intellectual Property Administration, P. R. China, Office Action in Chinese Patent Application No. 202011270456.1, 28 pp. (Nov. 29, 2023).

* cited by examiner

MEASUREMENT SYSTEM FOR DETERMINING LIQUID PROPERTIES IN A VESSEL

CROSS-REFERENCE TO PRIOR APPLICATION

Priority is claimed to European Patent Application No. EP 19 208 994.4, filed on Nov. 13, 2019, the entire disclosure of which is hereby incorporated by reference herein.

FIELD

The present invention relates to a measurement system for determining the density ρ or the compressibility κ of a liquid medium, a method for determining these liquid properties, the use of the measurement system, a control unit, a computer program element and a computer-readable medium.

BACKGROUND

Several industrial processes require continuous measurement of liquid properties, including density and compressibility, for efficient operation and to ensure quality and uniformity of the products. Applications include sugar and ethanol mills, beer plants, dairy makers, chemical and petrochemical, mining and pulp and paper industries. Despite numerous approaches, only a few techniques can be practically applied in industrial environments to measure the density of a liquid inside vessels without extraction. Usual density and compressibility measurements are based on invasive or extractive methods and require laboratory instrumentation. For example, a vibrating fork may be placed inside a vessel and put in direct contact with the liquid. Density change of the liquid medium manifests in the resonance frequency shift of the tuning fork. The presence of gas bubbles or product deposition or sedimentation at the sensing fork may limit the applicability of the method. In a further example, the liquid is tapped from a main flow. Liquid parameters (gas volume fraction and density) are determined by taking pressure differences and level in a calibrated vessel into account. Here, the level is measured with an ultrasound Doppler sensor, which limits the accuracy since the sound speed varies with temperature.

SUMMARY

In an embodiment, the present invention provides a measurement system for determining a density ρ or a compressibility κ of a liquid medium in a vessel, comprising: at least one pressure sensor configured to measure a hydrostatic pressure Δp of the liquid medium as a measured hydrostatic pressure Δp; at least one ultrasound sensor configured to measure a first time of flight $t_1$ along a first propagation path comprising a point at a level surface of the liquid medium, and to measure a second time of flight $t_2$ along a second propagation path, which is different from the first propagation path; and a control unit configured to determine the density ρ or the compressibility κ of the liquid medium based on the measured hydrostatic pressure Δp, the first time of flight and the second time of flight $t_2$.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1A:
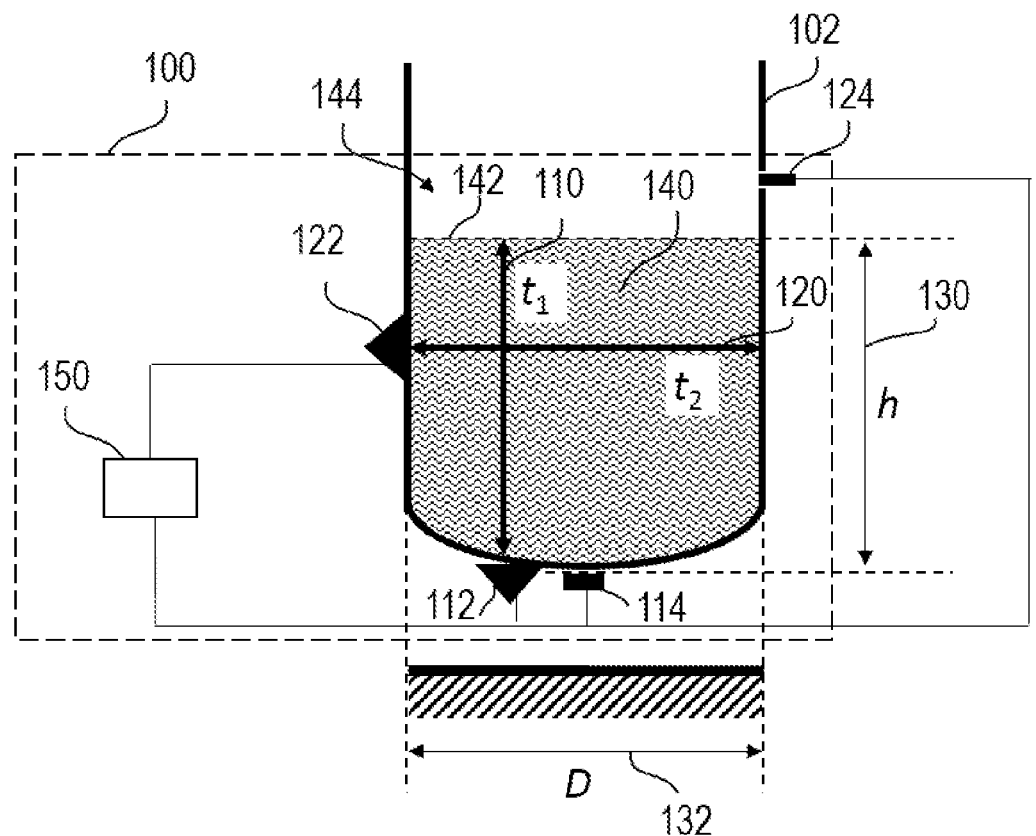
FIG. 1a shows diagram of a first example of a measurement system for measuring liquid properties.

In an embodiment, the present invention provides a system and a method for determining liquid parameters non-invasively with improved measurement reliability.

The described embodiments similarly pertain to the measurement system for determining liquid properties of a medium, the method for determining liquid properties of a medium, the use of the measurement system, the control unit, the computer program element and the computer-readable medium. Synergetic effects may arise from different combinations of the embodiments although they might not be described in detail.

Further on, it shall be noted that all embodiments of the present invention concerning a method, might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

Technical terms are used by their common sense. If a specific meaning is conveyed to certain terms, definitions of terms will be given in the following in the context of which the terms are used.

According to a first aspect, a measurement system for determining a density ρ or a compressibility κ of a liquid medium is proposed. The measurement system comprises at least one pressure sensor configured to measure the hydrostatic pressure Δp of the medium, at least one ultrasound sensor configured to measure a first time of flight $t_1$ along a first propagation path comprising a point at the level surface of the medium, and to measure a second time of flight $t_2$ along a second propagation path, which is different from the first propagation path, and a control unit. The control unit is configured to determine the density ρ or the compressibility κ of the medium based on the measured hydrostatic pressure Δp, the first time of flight $t_1$, and the second time of flight $t_2$.

The term "vessel" is used here representatively for tanks, reservoirs, containers etc. that are suitable to receive a liquid medium, especially for the purpose of industrial processing, and which are suitable for performing measurements as described in this disclosure. The term "medium" relates to a liquid medium. The term "ultrasound sensor" is used equivalent to the terms "ultrasound transducer" or "transducer". The ultrasound sensor(s) may be capable to send and to receive ultrasound signals. The control unit may comprise hardware, such as a processor, communication devices for receiving data from the sensors by wire or over the air, for sending signals to the sensors, and optionally for communicating with network devices. The control unit may further be comprise a storage for storing code and data. The control unit may be a single device inside an enclosure or a logical device consisting of several locally distributed hardware devices. Instead of ultrasound sensors, also radar sensors may be used, thus the scope of the term "ultrasound sensors" shall also comprise radar sensors or other sensors that are capable to send and receive a signal and to measure the time of flight of the signal.

The ultrasound sensors can be arranged at the outside of the vessel, so that the times of flight are measured non-invasively. Therefore, no drills or openings have to be foreseen to place sensors inside the vessel or to get in contact with the medium in order to analyze the medium.

The speed of sound c in the medium is temperature dependent. Since the speed is determined at the current temperature using the second ultrasound measurement, this dependency has only a negligible effect with respect to an error in the determination of the speed of sound c.

The density $\rho$ may be expressed as a function of liquid height h, differential pressure (between tank bottom and a position above the tank) $\Delta p$, and gravitational constant g by $$\rho = \frac{\Delta p}{gh}$$

and the compressibility K is related to the speed of sound c and the liquid density by $$\kappa = \frac{1}{\rho c^2}.$$

The unknown variables h and c can be eliminated such that $\rho$ and $\kappa$ depend on known constants and the measured times of flight, $t_1$ and $t_2$. The elimination presumes that the propagation path includes the level height (or, more precisely, depends in a deterministic and known way on the level height). If the level height can be expressed by a geometric term comprising $t_2$ and c, the level height has not to be calculated explicitly.

According to an embodiment, the pressure sensor is a differential sensor arrangement configured to measure the difference of the pressure at the bottom of the vessel and above the level surface. Alternatively, the vessel is equipped with two pressure sensors. The sensors measure the pressure difference $\Delta p = p_1 - p_2$ in the vessel. The sensors may be part of an existing level measurement system. Typically, the inlet port for $p_1$ is installed at the vessel bottom while $p_2$ is located at the top of the vessel providing the pressure in the overhead space.

For example, the vessel has a cylindrical shape and the known length corresponds to a diameter D of the vessel. The diameter of the vessel is usually known and the propagation path in a direction, e.g. horizontally, along a diameter is often easy to realize. In case that the diameter is unknown, it may be measured by applying known methods. Alternatively, the shape of the vessel is rectangular. In this case, the propagation path may run in a horizontal direction parallel to the vessel walls, such that the length of the side of the wall is the known length.

According to an embodiment, the measurement system comprises a first ultrasound sensor and a second ultrasound sensor. The first ultrasound sensor is configured to emit a first ultrasound signal in a vertical direction and to receive the signal, that is reflected at the surface of the medium, in order to measure the first time of flight $t_1$. The second ultrasound sensor is configured to emit a second ultrasound signal in a horizontal direction and to receive the signal reflected at the wall of the vessel at a point opposite to the second ultrasound sensor, in order to measure the second time of flight $t_2$. This arrangement of the sensors may, for example, be applied when sufficient space at the wall of the vessel is available to mount the second sensor. Furthermore, it allows to use one sensor emitting and receiving the signal in the horizontal direction to determine the speed of sound c and the other sensor emitting and receiving the signal in the vertical direction to determine the level h. It has to be noted that determining the level h is not necessary for determining the density $\rho$ and compressibility $\kappa$, since the level h can be expressed in terms of c and $t_1$ (and a geometrical factor, dependent on the propagation path). In case of a cylindrical vessel, preferably, the propagation path in horizontal direction runs radially, so that the known diameter D can be used as geometric constant. The implementation of such an arrangement is simple, as well as the controlling of the ultrasound sensors, because they can operate completely independent with respect to frequency and time.

According to a further embodiment, the measurement system comprises again a first ultrasound sensor and a second ultrasound sensor. The first ultrasound sensor is arranged opposite to the second ultrasound sensor and is positioned at the same height as the second ultrasound sensor. The first ultrasound sensor is configured to receive a first ultrasound signal, in order to measure the first time of flight $t_1$, and to emit a second ultrasound signal horizontally in direction to the second ultrasound sensor. The second ultrasound sensor is configured to emit the first ultrasound signal such that the first ultrasound signal is reflected at the surface of the medium and the reflected signal hits the first ultrasound sensor, and to receive the second ultrasound signal, in order to measure the second time of flight $t_2$. The level h can be determined with knowledge of the geometry of the propagation path, for example, the angle at which the signal is emitted and received to receive a maximum amplitude, and the height of the sensors with respect to the bottom of the vessel. This arrangement may be used, for example, if there is no space at the bottom of the vessel for mounting the ultrasound sensor, however, at the side walls.

According to a further embodiment the measurement system comprises one single ultrasound sensor, e.g. for determining the density $\rho$ and compressibility $\kappa$ of the medium. The one ultrasound sensor is configured to emit a first ultrasound signal in a vertical direction and to receive the first ultrasound signal reflected at the surface of the medium, in order to measure the first time of flight $t_1$. The one ultrasound sensor is further configured to emit a second ultrasound signal such that it is reflected at a first point on the wall, at the surface of the medium, and at a second point of the wall opposite to the first point, and receive the reflected second signal, in order to measure the second time of flight $t_2$. The second ultrasound signal is reflected three times, therefore the signal might be more attenuated and the peak amplitude is more difficult to detect than in other configurations, however, only one sensor is necessary. The first signal may be distinguished from the second signal by time, frequency or space multiplexing, where space multiplexing means distinguishing the angles of arrival of the first and the second signal. This arrangement may be used, for example, if there is no space at the side wall for mounting a sensor but at the bottom of the vessel.

According to an further embodiment, the control unit is further configured to perform the following steps for correcting the density $\rho$:

In a first step, a level height $h_{ac}$ based on the second time of flight $t_2$ is determined.

In a second step 2, a level height $h_p$ based on the hydrostatic pressure $\Delta p$ is determined.

In a third step 3, the difference $\varepsilon(h)=h_{ac}-h_p$ between the level height $h_{ac}$ and the level height $h_p$ is determined.

Steps 1 to 3 may be repeated in different measurements, so that an average value over the differences $\varepsilon(h)$ for one level may be determined.

In a fourth step 4, the previous steps 1 to 3 are repeated for at least one further reference level.

In a fifth step 4, the differences E, or the average values, respectively, over the reference levels are analyzed and a slope is determined. If a significant slope is present on the average values, in a sixth step 6, the density $\rho$ is corrected according to the slope. The slope, or the correction, resp., may be based on absolute values $h_{ac}$, $h_p$ of a level measurement:

$$\rho_{true} = \frac{h_{ac}\rho_{false}}{h_p}.$$

or on difference values $h_{ac}-h'_{ac}$, hp-h'$_p$ obtained from measurements of two different levels:

$$\rho_{true} = \frac{(h_{ac} - h'_{ac})\rho_{false}}{h_p - h'_p},$$

as explained further below.

Steps 1 to 6 may be repeated until the slope is, e.g. below a threshold, or not detectible any more.

According to an aspect, a method for determining a density $\rho$ or a compressibility $\kappa$ of a liquid medium in a vessel is provided. The method comprises the following steps:

In a first step, the hydrostatic pressure $\Delta p$ of the liquid medium is measured. In a second step, a first time of flight $t_1$ along a first propagation path comprising a point at the level surface is measured. In a third step, a second time of flight $t_2$ corresponding to a known length along a second propagation path is measured, and in a fourth step, the density $\beta$ or the compressibility $\kappa$ of the medium are determined based on the measurements. The steps of the method may be carried in a different order or simultaneously, if applicable.

According to a further aspect, a control unit is provided. The control unit is configured to determine a density $\beta$ or a compressibility $\kappa$ of a liquid medium based on a measurement of a hydrostatic pressure $\Delta p$, a first time of flight $t_1$ along a first propagation path comprising a point at the level surface of the medium, and a second time of flight $t_2$ along a second propagation path, which is different from the first propagation path.

According to a further aspect, a program element is provided, which when being executed on a processor of the control unit, controls a measurement system as described above to perform the steps of the method described above.

According to a further aspect, a computer readable medium is provided on which a program element according the above described program element is stored.

The computer program element may be part of a computer program, but it can also be an entire program by itself. For example the computer program element may be used to update an already existing computer program to get to the present invention.

The controller may comprise circuits without programmable logics or may be or comprise a micro controller, a field programmable gate array (FPGA), an ASIC, a Complex Programmable Logic Devices (CPLD), or any other programmable logic devices known to person skilled in the art.

The computer readable medium may be seen as a storage medium, such as for example, a USB stick, a CD, a DVD, a data storage device, a hard disk, or any other medium on which a program element as described above can be stored.

The system and the method proposed in this disclosure allows to measure density and compressibility by means of combining (i) a pressure difference measurement, and (ii) an ultrasonic non-invasive level measurement. The non-invasive level sensor can be added on a vessel without adaptations as, for example, drilling holes or welding additional flanges. A consequent recommissioning and/or process breakdown can be avoided. Further, an average density and compressibility of the liquid can be measured without extracting samples from the vessel for external analysis, and the measurement accuracy can be improved.

The features presented above and other features, aspects and advantages of the present invention will become better understood with reference to the accompanying figure and the following description.

Figure 1B:
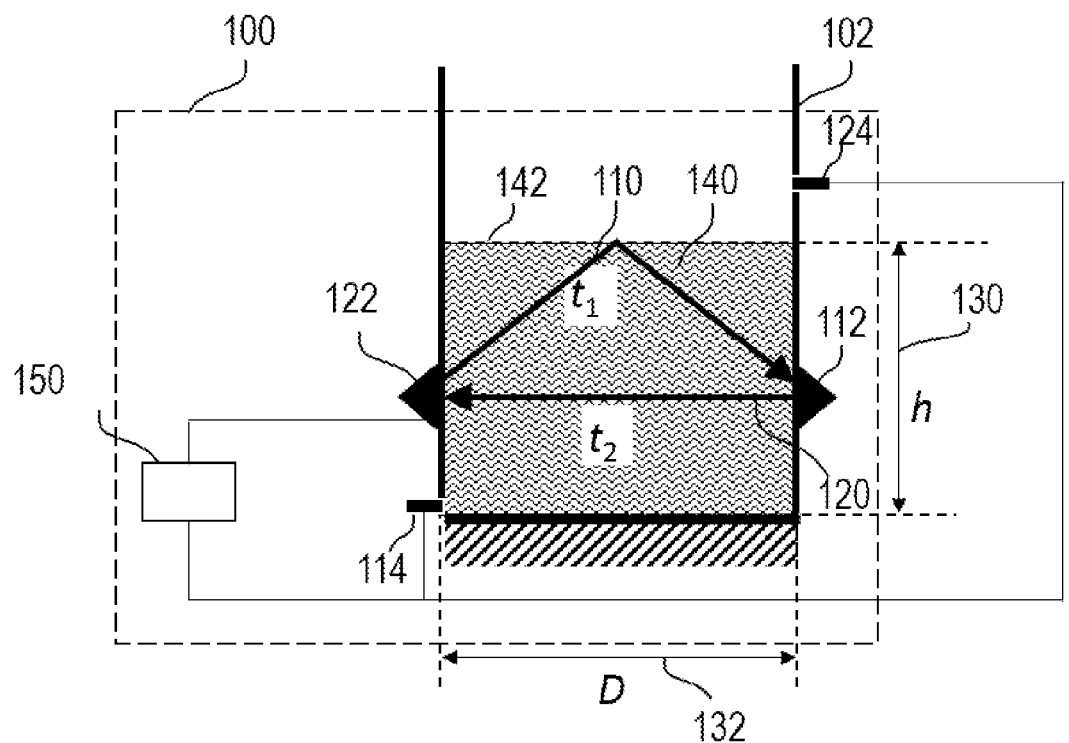
FIG. 1b shows diagram of a second example of a measurement system for measuring liquid properties.
Figure 1C:
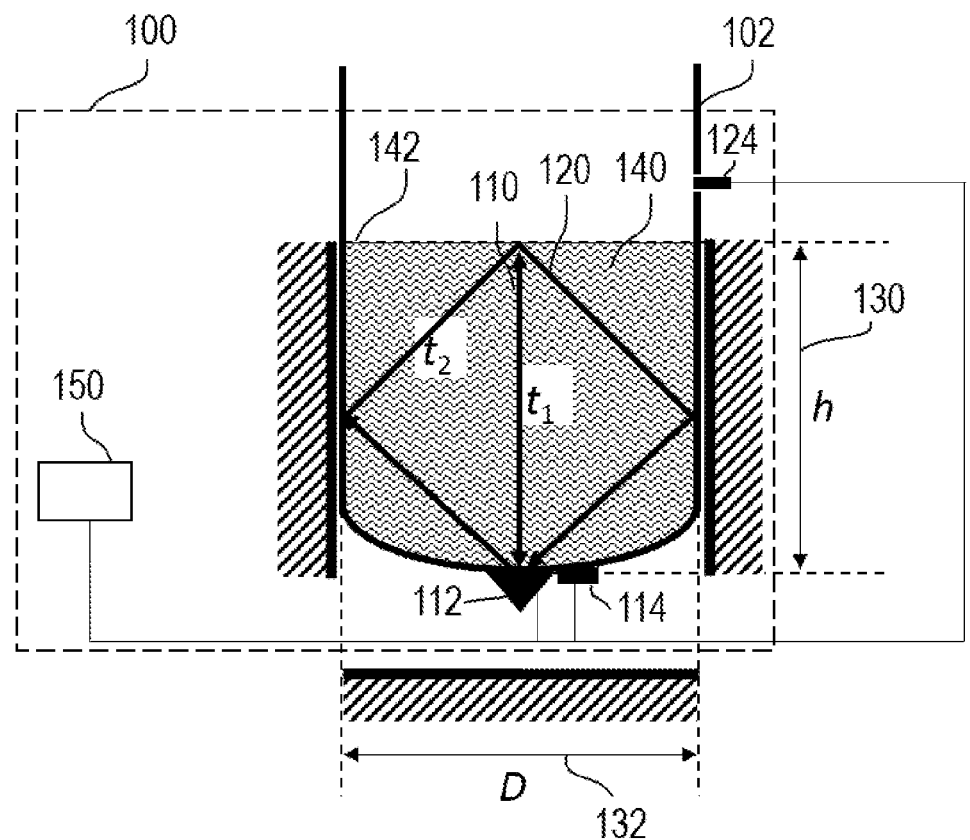
FIG. 1c shows diagram of a third example of a measurement system for measuring liquid properties.

FIGS. 1a to 1c show examples of a measurement system 100 for measuring liquid properties, such as the density $\beta$ or the compressibility $\kappa$, in a vertical, industrial storage tank 102 of cylindrical shape. The examples differ in the available space for placing a first ultrasound sensor 112 or a first and a second ultrasound sensor 112 and 122, respectively, and pressure sensor 114. The measurement system 100 is capable of determining liquid properties of a medium 140 in the vessel 102.

The measurement system in the figures comprises further a pressure sensors 114 and 124 above the level of the medium 140 and at the bottom of the vessel, for measuring the hydrostatic pressure $\Delta p$ of the liquid medium. The pressure sensors 114 and 124 may be realized as a differential sensor 114, 124.

At least one ultrasound sensor (112, or 112 and 122) is used to measure a first time of flight $t_1$ along a first propagation path 110 comprising a point at the level surface, and to measure a second time of flight $t_2$ 120 corresponding to a known length along a second propagation path, and a control unit 150. The control 150 unit is configured to determine the liquid properties of the medium based on the measured hydrostatic pressure $\Delta p$, the first time of flight $t_1$, and the second time of flight $t_2$.

In the example of FIG. 1a, there are no spatial limitations for placing a first 112 and a second 122 ultrasound sensor, and a pressure sensor 114, 124 at the side walls and at the bottom of the vessel. Therefore, an arrangement of the ultrasound sensors 112 and 122 with a back reflection in the opposite horizontal or vertical direction is possible as indicated by the arrows 110 and 120 in FIG. 1a. The pressure sensor 114 can be placed at the bottom of the vessel.

The differential pressure sensor 114, 124 measures the pressure difference $\Delta p=p_1-p_2$ in the vessel or tank. The sensor 114, 124 may be part of an existing level measurement system. Typically, the inlet port for $p_1$ is installed at the tank bottom while $p_2$ is located at the top of the tank providing the pressure in the overhead space 144. In addition, the tank is equipped with a non-invasive ultrasonic sensor system that comprises ultrasound sensors or transducers, resp., 112 and 122, which are attached at the outside wall of the vessel. Considering the configuration in FIG. 1*a*, the temperature-dependent sound speed c can be calculated by $$c = \frac{2D}{t_2},$$

where D 132 and $t_2$ refer to the tank diameter and the propagation time of the acoustic echo pulse from the wall opposite to the transducer 122, respectively. The propagation times may need to be corrected here and in the sequel for the time of propagation in the transducer and the vessel wall. The corresponding acoustic path is indicated by arrow 120. Knowing c, the level h can be inferred from $$h = \frac{ct_1}{2},$$

where $t_1$ refers to the propagation time of the acoustic echo pulse from the level interface 142 as indicated by arrow 110. By combining the pressure difference $\Delta p = p_1 - p_2$ with the parameters c and h, the density ρ can be indirectly determined by $$\rho = \frac{\Delta p}{Dg} \frac{t_2}{t_1},$$

where g is the local gravitational acceleration. The acceleration can be measured by an additional sensor (not shown in FIGS. 1*a* to 1*c*), calibrated on-site and stored, e.g., in the control unit 150, which may comprise a signal processing unit, or calculated from the position on Earth. In addition, the compressibility of the medium 140 can be determined by $$\kappa = \frac{1}{\rho c^2} = \frac{t_2 t_1}{4D} \frac{g}{\Delta p}.$$

FIG. 1*b* shows an example where no space is available at the bottom side of the tank 102 for mounting a sensor. The pressure sensor 114 is mounted at the bottom on the side wall and two ultrasound sensors 112, 122 are attached opposite of each other on the wall of the tank 102 at the same height. The first ultrasound sensor 112 receives a first ultrasound signal emitted by the second ultrasound sensor 122, and emits a second ultrasound signal horizontally (indicated by arrow 120) in direction to the second ultrasound sensor 122. The first ultrasound signal (indicated by arrow 110) is emitted such that the second ultrasound signal is reflected at the surface 142 of the medium 140 and the reflected signal hits the first ultrasound sensor 112, and to receive the second ultrasound signal. In this case, the level height may be expressed in terms of $t_1$ and c by using the height of the sensors above the bottom side of the tank 102 and, e.g. an emit angle at which a maximum amplitude is received at the sensor 112.

FIG. 1*c* shows a further example of a measurement system. If the side walls are not (or partially) accessible, a single transducer 112 can be attached to the tank bottom and used for measuring $t_1$ and $t_2$.

Considering a symmetric geometry, as shown in FIG. 1*c*, the level hh and the sound speed c can be determined by using $$h = \frac{D}{\sqrt{\left(\frac{t_2}{t_1}\right)^2 - 1}}.$$

The density ρ and the compressibility κ can be obtained by $$\rho = \frac{\Delta p \sqrt{\left(\frac{t_2}{t_1}\right)^2 - 1}}{Dg} \text{ and}$$

$$\kappa = \frac{g(t_2^2 - t_1^2)}{4\Delta p \sqrt{\left(\frac{t_2}{t_1}\right)^2 - 1}}.$$

In the most general case, let us assume that we measure along two different paths. Hence, the distances c $t_1$ and c $t_2$ are functions of the geometrical parameters (in our case h and D; there could be additional parameters D1, D2, . . . ). Clearly, the ratio $t_1/t_2$ then depends only on geometric quantities (h, D1, . . . ) and is independent of the sound velocity, e.g.

$$\frac{t_1}{t_2} = f\left(\frac{h}{D_1}, \frac{h}{D_2}, \dots\right),$$

where f is a geometry dependent function that can depend only on the ratio of h and Dn as it has to be non-dimensional. The two measuring paths now have to be chosen such that this equation can be solved for h and inserted into the equation $$\rho = \frac{\Delta p}{gh}$$

Therefore, it is a generic feature that the density can be expressed as a function of the ratio $t_1/t_2$—no other combination of $t_1$ and $t_2$ is needed. Hence, according to an embodiment, the density is evaluated from a function g of the form $$\rho = g\left(\frac{t_1}{t_2}, D_1, D_2 \dots\right) \frac{\Delta p}{o},$$

where the function g depends only on the ratio of the measured the first time of flight $t_1$, and the second time of flight $t_2$ and geometrical constants defined by the vessel and the first and second propagation paths.

$$\rho = g\left(\frac{t_1}{t_2}, D_1, D_2 \dots\right) \frac{\Delta p}{g}$$

In order to improve the accuracy, the density of the liquid can be determined iteratively at different levels. To perform this, the level error ε is determined as a function of level, which is defined as the difference between the acoustic and pressure-based level measurement $$\varepsilon(h) = h_{ac} - h_p,$$

where $$h_{ac} = \frac{ct_1}{2} \text{ and}$$

$$h_p = \frac{\Delta p}{\rho g}.$$

Figure 2:
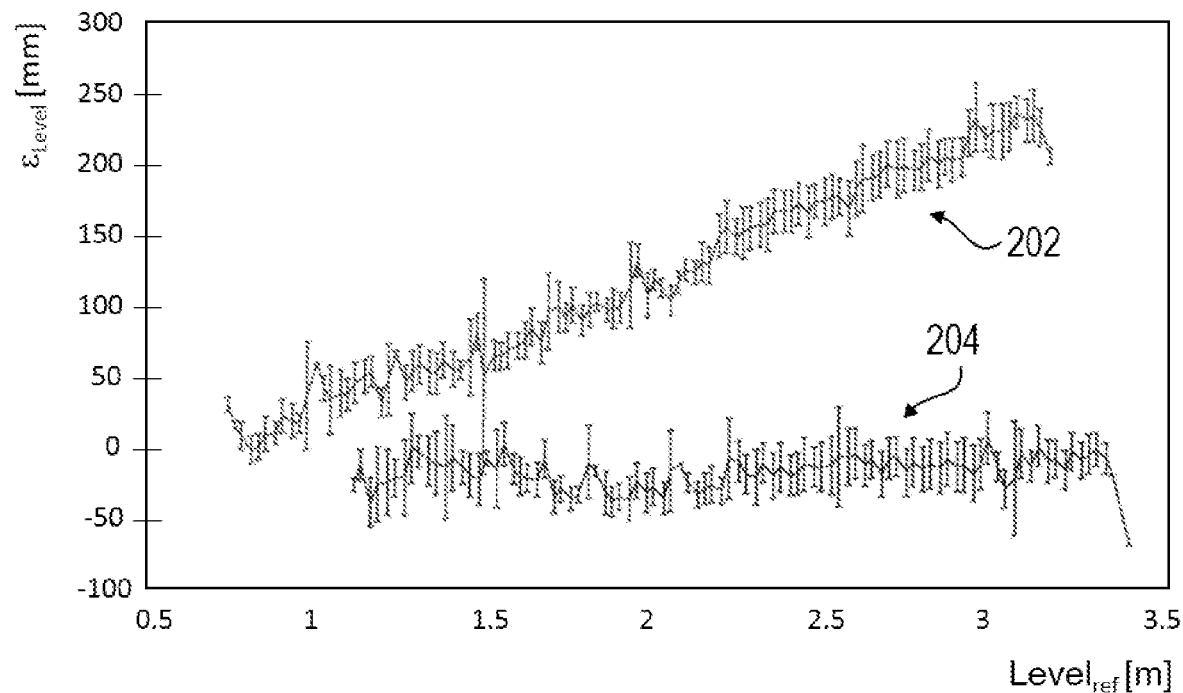
FIG. 2 shows a plot of the level error as a function of a reference level.
Figure 3:
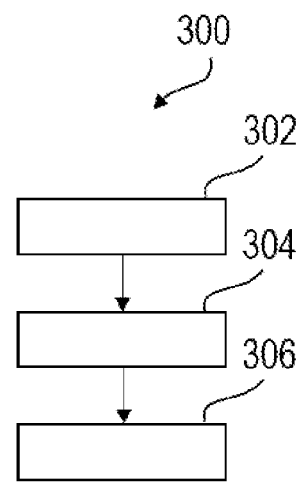
FIG. 3 shows a flow diagram of a method for measuring liquid properties.

Here, ρ can be either measured or entered as a starting value (initial guess) by the user. The level error is then measured over different levels and analyzed. A typical example for an erroneous and a correct estimation of the density is displayed in the diagram 200 in FIG. 2. Here, the slope 202, 204 of the level error gives indication as to whether the density was determined correctly. If ρ is correct, the level error can be considered as constant over level, i.e. its slope is zero (slope 204), otherwise the slope is non-zero (slope 202).

An average value for ρ can be determined based on several measurements over an extended level range.

Based on above formulas, the erroneous density is $$\rho_{false} = \frac{\Delta p}{gh} = \frac{h_g \rho_{true} g}{g h_{ac}},$$

so that ρ may be corrected by hac/hp:

$$\rho_{true} = \frac{h_{ac} \rho_{false}}{h_p},$$

where "true" is to be understood as "corrected" or "new" value for the next iteration step This iterative estimation of the density improves the accuracy of the measurement—even if the individual measurements of t and p show a high variation or if the level measurement (e.g. from $t_1$) has an unknown offset.

In practical cases, due to possible offset errors of the measurements of pressure and ultrasound level, one may rather rely on the differences between two measurements at different level (than on the absolute values). Clearly, making at two different levels h and h' respective measurements and taking the difference, we have $$\rho_{true} = \frac{(h_{ac} - h'_{ac})\rho_{false}}{h_p h'_p}$$

This equation gives a good estimate for the true density independent of possible uncontrolled offsets in the level measurements.

The invention uses non-invasive apparatus for the measurement which allows easy installation without modifications on the vessel or tank 102, and without process breakdown and/or recommissioning. A liquid level 142 does not need to be determined explicitly. The measurement of the sound speed c in the medium allows high-accuracy level measurement in a wide temperature range, independent of the liquid composition.

Other variations to the disclosed embodiments can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A measurement system for determining a density ρ or a compressibility κ of a liquid medium in a vessel, comprising:
    at least one pressure sensor configured to measure a hydrostatic pressure Δp of the liquid medium as a measured hydrostatic pressure Δp;
    at least one ultrasound sensor configured to measure a first time of flight $t_1$ along a first propagation path comprising a point at a level surface of the liquid medium, and to measure a second time of flight $t_2$ along a second propagation path, which is different from the first propagation path; and
    a control unit configured to determine the density ρ or the compressibility κ of the liquid medium based on the measured hydrostatic pressure Δp, and a ratio of the first time of flight $t_1$ and the second time of flight $t_2$.

2. The measurement system according to claim 1, wherein the at least one pressure sensor comprises a differential sensor arrangement configured to measure a difference between a pressure at a bottom of the vessel and above the level surface.

3. The measurement system according to claim 1, where the density ρ is evaluated as follows $$\rho = g\left(\frac{t_1}{t_2}, D_1, D_2 \ldots\right)\frac{\Delta p}{g},$$

where g is a gravitational constant and $D_1$ and $D_2$ are diameters defined by the vessel and the first and second propagation paths, respectively.

4. The measurement system according to claim 1, wherein the at least one ultrasound sensor comprises a first ultrasound sensor and a second ultrasound sensor,
wherein the first ultrasound sensor is configured to emit a first ultrasound signal in a vertical direction and to receive a signal that is reflected at the level surface of the liquid medium to measure the first time of flight $t_1$, and
wherein the second ultrasound sensor is configured to emit a second ultrasound signal in a horizontal direction and to receive a signal reflected at a wall of the vessel at a point opposite the second ultrasound sensor to measure the second time of flight $t_2$.

5. The measurement system according to claim 1, wherein the at least one ultrasound sensor comprises a first ultrasound sensor and a second ultrasound sensor,
wherein the first ultrasound sensor is arranged opposite the second ultrasound sensor and at a same height as the second ultrasound sensor,
wherein the first ultrasound sensor is configured to receive a first ultrasound signal in order to measure the first time of flight $t_1$ and to emit a second ultrasound signal horizontally in direction of the second ultrasound sensor, and
wherein the second ultrasound sensor is configured to emit the first ultrasound signal such that the first ultrasound signal is reflected at a surface of the liquid medium and a reflected signal hits the first ultrasound sensor, and to receive the second ultrasound signal, in order to measure the second time of flight $t_2$.

6. The measurement system according to claim 1, wherein the at least one ultrasound sensor comprises one ultrasound sensor,
in the one ultrasound sensor is configured to emit a first ultrasound signal in a vertical direction and to receive the first ultrasound signal reflected at the level surface of the liquid medium to measure the first time of flight $t_1$,
wherein the one ultrasound sensor is further configured to emit a second ultrasound signal and to reflect the second ultrasound signal at a first point on a wall, at the level surface of the liquid medium, and at a second point of the wall opposite the first point, and receive a reflected second signal, in order to measure the second time of flight $t_2$.

7. The measurement system according to claim 1, wherein the control unit is configured to perform the following steps for correcting the density ρ:
step 1: determining a level height $h_{ac}$ based on the first time of flight $t_2 t_1$;
step 2: determining a level height $h_p$ based on the hydrostatic pressure Δp;
step 3: determining a difference $\varepsilon(h) = h_{ac} h_p$ between the level height $h_{ac}$ and the level height $h_p$;
step 4: repeating steps 1 to 3 for at least one further reference level;
step 5: analyzing differences E over the reference levels and determining a slope, and if the slope is present on average values, and
step 6: correcting the density ρ according to the slope.

8. A method of using the measurement system according to claim 1 in a sugar mill, an ethanol mill, a beer plant, a dairy maker, a chemical plant, a petrochemical plant, in mining, or in a pulp and paper mill.

9. A method for determining a density ρ or a compressibility κ of a liquid medium in a vessel, the method comprising:
measuring a hydrostatic pressure Δp of the liquid medium;
measuring a first time of flight $t_1$ along a first propagation path comprising a point at a level surface of the liquid medium, and measuring a second time of flight $t_2$ corresponding to a known length along a second propagation path; and
determining the density ρ or the compressibility κ of the liquid medium based on the hydrostatic pressure Δp, and a ratio of the first time of flight $t_1$ and the second time of flight $t_2$.

\* \* \* \* \*